United States Patent [19]
Johansen et al.

[11] 3,905,398
[45] Sept. 16, 1975

[54] COMPOSITE REINFORCED HOSE WHEREIN THE REINFORCING MATERIAL IS BRAIDED AROMATIC POLYAMIDE FILAMENTS

[75] Inventors: Hans A. Johansen; Larry R. Phillippi; Edward A. Green, all of Mantua, Ohio

[73] Assignee: Samuel Moore & Company, Aurora, Ohio

[22] Filed: Apr. 23, 1974

[21] Appl. No.: 463,371

[52] U.S. Cl. ............... 138/124; 138/125; 138/137; 138/140
[51] Int. Cl. ............................................. F16l 11/04
[58] Field of Search ................... 138/123–125, 138/129, 137, 140, 141, 177

[56] References Cited
UNITED STATES PATENTS

| | | | |
|---|---|---|---|
| 2,977,839 | 4/1961 | Koch | 138/123 X |
| 3,062,241 | 11/1962 | Brumbach | 138/137 X |
| 3,115,164 | 12/1963 | Vanderbilt | 138/137 X |
| 3,203,933 | 8/1965 | Huffman et al. | 260/78 R |
| 3,233,024 | 2/1966 | Jackson et al. | 138/137 X |
| 3,245,431 | 4/1966 | Coe | 138/137 X |
| 3,301,739 | 1/1967 | Vanderbilt | 138/141 X |
| 3,310,447 | 3/1967 | Matthews | 138/125 X |
| 3,332,447 | 7/1967 | Holmgren | 138/141 X |
| 3,580,289 | 5/1971 | James | 138/123 X |
| 3,600,350 | 8/1971 | Kwolek | 260/78 A X |
| 3,604,461 | 9/1971 | Matthews | 138/125 X |
| 3,623,928 | 11/1971 | Wincklhofer et al. | 138/141 X |
| 3,637,606 | 1/1972 | Morgan | 260/78 A |
| 3,682,201 | 8/1972 | Atwell et al. | 138/125 |
| 3,722,550 | 3/1973 | Matthews | 138/137 |
| 3,750,712 | 8/1973 | Brand | 138/124 |
| 3,755,032 | 8/1973 | Higbee | 138/125 X |
| 3,766,146 | 10/1973 | Witsiepe | 260/40 R X |
| 3,773,088 | 11/1973 | Ball | 138/129 |
| 3,773,089 | 11/1973 | Chudgar | 138/141 X |

*Primary Examiner*—Henry K. Artis
*Assistant Examiner*—James E. Bryant, III
*Attorney, Agent, or Firm*—Clelle W. Upchurch

[57] ABSTRACT

A composite reinforced hose adapted to convey fluids under pressure has an extruded synthetic polymeric core tube, at least one layer of fibrous reinforcing material containing filaments having a tenacity of from about 12 to about 25 grams per denier and an elongation at break of from about 2% to about 7% and an extruded synthetic polymeric sheath.

16 Claims, 6 Drawing Figures

COMPOSITE REINFORCED HOSE WHEREIN THE REINFORCING MATERIAL IS BRAIDED AROMATIC POLYAMIDE FILAMENTS

This invention relates generally to flexible composite reinforced hose and more particularly to a flexible composite reinforced hose having an improved bursting strength.

Composite reinforced hose used for conveying fluids under pressure usually has an extruded synthetic polymeric core tube, a braided fibrous reinforcing material covering the core tube and an external extruded synthetic polymeric protective jacket or sheath. Most of the heretofore available hoses have been provided with a fibrous reinforcing layer of nylon filaments or poly(ethylene terephthalate) ester filaments. The nylon and poly(ethylene terephthalate) ester filaments are braided or helically wound under tension about the core tube to provide a reinforcement which supports the tube against radial expansion and bursting and undesirable elongation under the pressure of fluids conveyed therethrough. While these heretofore available fibrous reinforcing materials provide adequate support for the core tube against radial expansion and elongation in hoses designed to be used at moderate pressures of say up to about 10,000 pounds per square inch, it has been found that the thickness of the fibrous reinforcing layer must be of substantial thickness relative to the wall thickness of the hose to provide the burst strength required in hoses adapted to carry fluids at pressures above 10,000 psi. Consequently, the overall diameter of the hose is too large for many purposes. Moreover, in order to provide the required thickness of fibrous reinforcing material, a plurality of layers applied in separate braiding steps have been required which has increased the cost of the hose.

It is therefore an object of this invention to provide an improved composite reinforced hose. Another object of the invention is to provide a novel fibrous reinforcing material about a core tube of a flexible composite reinforced hose adapted to convey fluids under high pressures of greater than 10,000 psi. Still another object of the invention is to provide a novel flexible composite reinforced hose having an extruded synthetic polymeric core tube for conveying fluids, a fibrous layer of improved strength about the core tube to support it against radial expansion when the core tube is conveying fluids under pressure, and a protective jacket or sheath about the fibrous material. A further object of the invention is to provide a method for making an improved composite reinforced hose for conducting fluids under pressure.

Other objects will become apparent from the following description with reference to the accompanying drawing wherein FIG. 1 is a side elevation, partially cut-away and partially in section of one embodiment of the invention;

Figure 1:
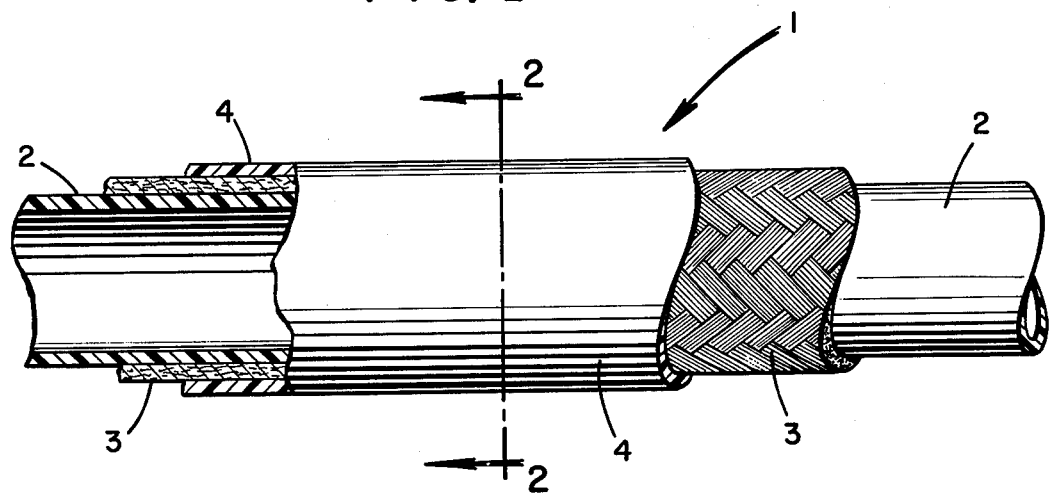

The foregoing objects and others are accomplished in accordance with this invention, generally speaking, by providing a flexible composite reinforced hose having an extruded synthetic polymeric core tube, a synthetic polymeric fibrous reinforcing material covering the core tube and having filaments which have a tenacity of at least about 12 grams per denier and up to about 25 grams per denier and, preferably, about 20 grams per denier, and an elongation at break of from about 2%, to about 7%, and preferably not more than 5%, and an extruded synthetic polymeric sheath covering the fibrous material. It has been found that the thickness of the fibrous reinforcing material between the core tube and sheath can be reduced significantly by helically winding or weaving into a braid a synthetic polymeric filament of the foregoing physical properties under tension about the core tube in reinforcing association therewith instead of or in combination with the heretofore available fibrous reinforcing materials such as nylon and poly(alkylene terephthalate) ester and polyvinyl alcohol fibers having a lower tenacity of about 7 to about 11 grams per denier and an elongation at break of from about 9 % to about 17%. Any synthetic polymeric filament or fiber having the aforesaid tenacity and elongation may be used but best results have been obtained so far with filaments spun from an aromatic polyamide fiber marketed by E. I. duPont de Nemours & Co. under the trademark "Kevlar" and known in the trade variously as "Fiber B" and as an "aramide" filament.

Fibers spun from "Kevlar" aromatic polyamide have a high modulus and are composed substantially of aromatic polyamide structures prepared by reacting an aromatic dicarboxylic acid and an aromatic diamine such as terephthalic acid or anhydride and $p$-phenylene diamine. Alternately, the aromatic polyamide may be an aromatic aminocarboxylic acid, such as, for example 4-amino-benzoic acid.

The "tenacity" of a filament is determined from the equation:

$$\text{tenacity} = \frac{\text{breaking strength of the filament in grams}}{\text{denier}}$$

The fibrous reinforcing material may be applied about the core tube with conventional apparatus in one or more passes. All of the layers may be either helically wound filaments or braid or a combination of braid and helically wound layers may be applied depending upon the physical properties required in the resulting composite reinforced hose. The lay of the strands of fibrous reinforcing material may be varied from an angle of about 40° to about 60° with the axis of the core tube depending upon the physical properties of the synthetic polymer used for the core tube and upon the pressures to which the hose will be subjected.

The core tube and sheath may be extruded from the same or different synthetic resinous polymers such as, for example, nylon, an elastomeric polyurethane, polyvinyl chloride or a segmented copolyester of the type sold by E. I. duPont de Nemours & Co. under the trademark "Hytrel" or the like.

The polyurethane core tube and sheath may be extruded from any extrudable thermoplastic polyurethane such as Pellethane sold by the Upjohn Co. or those polyurethanes disclosed in U.S. Pat. Nos. 3,116,760 and 3,722,550 granted to R. A. Matthews or in the book by Saunders and Frisch entitled *Polyurethanes: Chemistry and Technology*, published by Interscience Publishers, Copyright 1964, the disclosures of which are incorporated herein by reference. Thermoplastic polyurethanes prepared by reacting 4,4'-diphenylmethane diisocyanate and a poly(tetramethylene ether)glycol or poly-(caprolactone ester)glycol are preferred. Alternately, any suitable nylon may be used for the core tube or sheath such as that disclosed in U.S. Pat. No. 3,062,241 to Brumbach, the disclosure of which is incorporated herein by reference. Segmented thermoplastic copolyester elastomers of the type contemplated for the core tube are described in U.S. Pat. No. 3,766,146, the disclosure of which is incorporated herein by reference.

Suitable poly(ethylene terephthalate) ester fibrous reinforcing material is also disclosed in the Brumbach patent. Suitable nylon fibrous reinforcing material is disclosed in U.S. Pat. No. 3,334,165.

Since the primary advantage in using the fibrous reinforcing material having a tenacity of at least about 12 grams per denier is improved burst strength of the core tube, best results are obtained when these fibers are immediately adjacent to the core tube if a plurality of layers of different fibers are used. For example, a single braid of fibers having a tenacity of at least 12 grams per denier may be applied at a lay of about 55° adjacent to the core tube to reinforce the core tube against radial expansion and bursting. In other embodiments of the invention, a plurality of layers of fibers having a tenacity of at least 12 grams per denier may be used to reinforce the core tube. These layers may be braided or helically wound fibers. In a further embodiment, a reinforcing layer or layers of fibers having a tenacity of at least about 12 grams per denier may be braided or helically wound about the core tube and an additional layer or layers of lower tenacity fibers such as nylon or poly-(ethylene) terephthalate ester fibers may be wound or braided over the first layers. Moreover, the fibrous reinforcing layers can be formed by braiding or helically winding composite strands of fibers having a tenacity of at least about 12 grams per denier and strands of lower tenacity fibers such as nylon, poly(alkylene terephthalate) fibers such as "Dacron" sold by E. I. duPont de Nemours & Co. or the like. The use of such composite strands may facilitate selective bonding of adjacent layers of the composite hose and may improve the handling characteristics of the hose. Except from the standpoint of cost of manufacture, a hose in which all of the reinforcing fibrous material has a tenacity of at least 12 grams per denier and an elongation of about 2% to about 7% is preferred.

Figure 2:
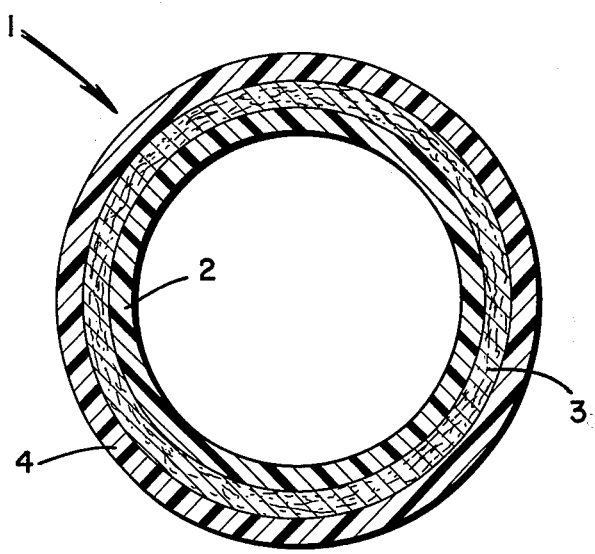
FIG. 2 is a cross-section taken along the line 2—2 of FIG. 1.

Referring now to the drawing, one embodiment of a composite reinforced hose 1 illustrated in FIGS. 1 and 2 has an extruded nylon core tube 2, a single braided reinforcing layer 3 of fibrous aromatic polyamide 1500 denier filaments ("Kevlar") having a tenacity of about 20 grams per denier and a protective extruded polyurethane Pellethane CPR 2102–90 A sheath 4.

Figure 3:
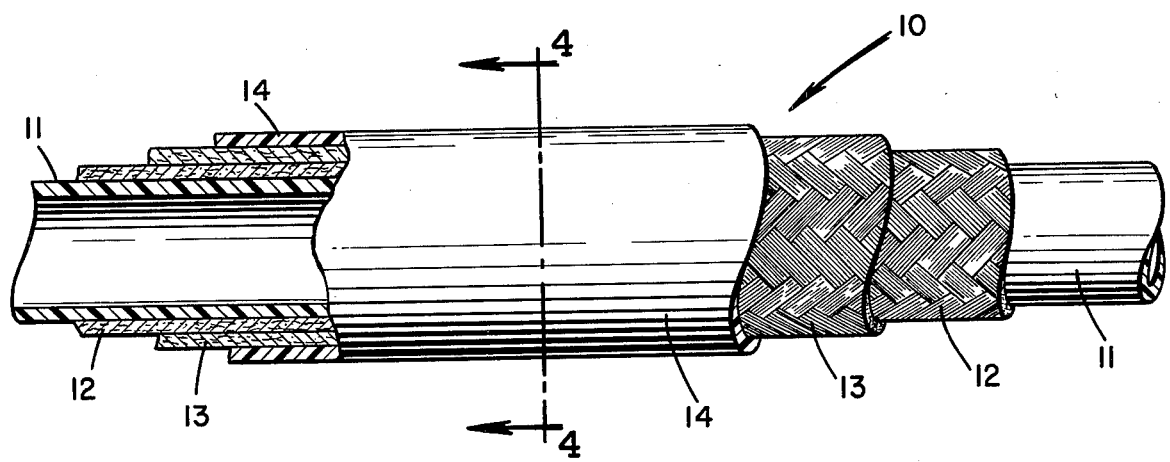
FIG. 3 is a side elevation, partially cut-away and partially in section of a second embodiment of the invention.
Figure 4:
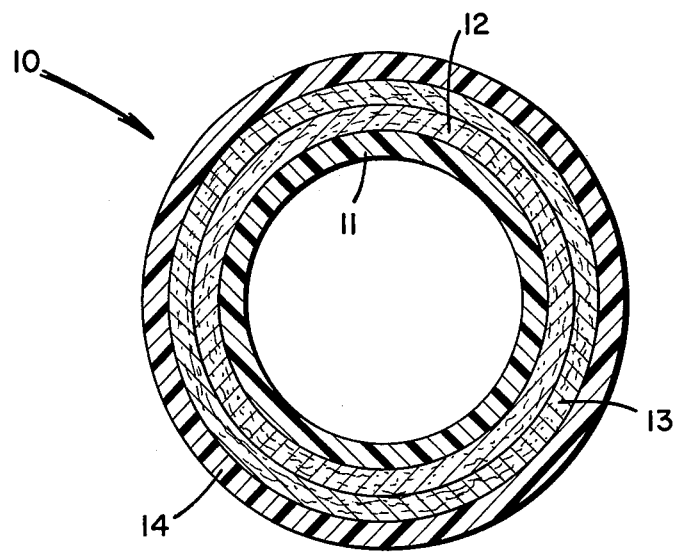
FIG. 4 is a cross-section taken along the line 4—4 of FIG. 1.

The embodiment of the hydraulic hose 10 of FIGS. 3 and 4 has an extruded thermoplastic polyurethane Pellethane CPR 2102–90 A core tube 11, a first braided reinforcing layer 12 of fibrous aromatic polyamide 1500 denier filaments ("Kevlar") having a tenacity of about 20 grams per denier, a second braided reinforcing layer 13 of poly(ethylene terephthalate) ester such as "Dacron" having a denier of about 1100 and a tenacity of about 8 grams per denier, and a protective extruded thermoplastic polyurethane Pellethane CPR 2102–90 A sheath 14.

Figure 5:
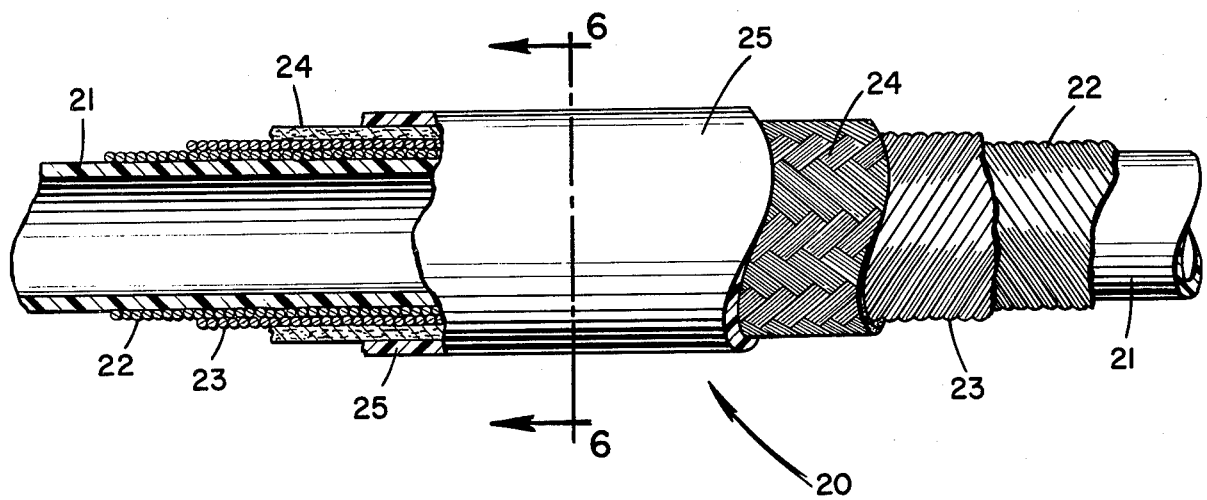
FIG. 5 is a side elevation, partially cut-away and partially in section of an embodiment of the invention reinforced with helically wound fibrous material.
Figure 6:
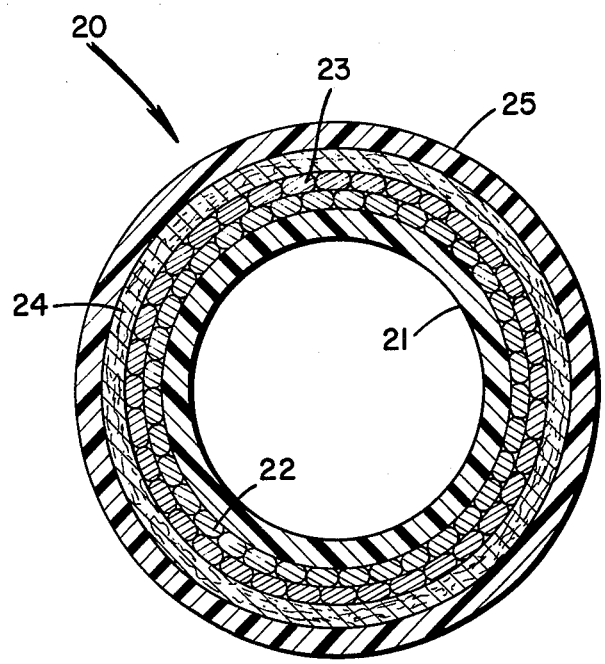
FIG. 6 is a cross-section taken along the line 6—6 of FIG. 5.

The composite reinforced hose 20 adapted to convey fluids under pressure illustrated in FIGS. 5 and 6 of the drawing has an extruded segmented copolyester ("Hytrel") core tube 21, lapped reinforcement composed of two oppositely helically wound layers 22 and 23 of composite strands of fibrous aromatic polyamide 1500 denier filaments ("Kevlar") having a tenacity of about 20 grams and 1100 denier nylon filaments having a tenacity of about 8 grams per denier, a braided reinforcing layer 24 of poly(ethylene terephthalate) ester ("Dacron") having a denier of about 1100 and a tenacity of about 8 grams per denier, and an extruded protective polyurethane (Pellethane CPR 2102–90 A sheath 25.

The fibrous reinforcing layer covering the core tube may or may not be adhesively bonded to the wall of the core tube, but, for best results, it is bonded thereto. The outermost layer of reinforcing material may or may not be bonded to the sheath. Likewise, if a plurality of layers of reinforcing material are used, adjacent layers may or may not be adhesively bonded together. Adjacent strands and layers of helically wound reinforcement may be bonded together. Any suitable adhesive may be used for bonding the various plies or strands together such as, for example, a polyurethane adhesive, a rubber cement or other elastomeric adhesive. The adhesive for bonding the core tube to the adjacent layer of reinforcing material may be formed from the surface of the core tube as disclosed in U.S. Pat. No. 3,722,550 or the adhesive disclosed in U.S. Pat. No. 3,116,760 may be used. Suitable adhesives are also disclosed in U.S. Pat. Nos. 3,726,321 and 3,332,447. The disclosures of the foregoing patents are incorporated herein by reference.

It has been found that a significantly thinner reinforcing layer is required to reinforce a hose to withstand a given pressure than with the prior art reinforcing fibrous materials and that hoses capable of conveying fluids under greater pressures than the prior art hoses can now be provided. The strands of the reinforcing material may be disposed under tension about the core tube at an angle of lay which provides for minimum volumetric expansion of the core tube. The reinforcing fibrous material may be applied as a braid by a conventional braiding machine or strands of fibrous material may be helically wound with conventional apparatus. The tension on the strand may range from about 1 to about 10 pounds per strand and the reinforcing material may be applied over the entire underlying surface, or in other words, applied to provide as nearly 100% coverage as possible.

Although the invention has been described in detail for the purpose of illustration, it is to be understood that such detail is solely for that purpose and that variations can be made therein by those skilled in the art without departing from the scope and spirit of the invention except as it may be limited by the claims.

What we claim is:

1. A high burst strength flexible composite reinforced hose for conveying fluids under pressure comprising a synthetic polymeric core tube, a fibrous reinforcing material about the core tube having synthetic filaments having a tenacity of from 12 to about 25 grams per denier with an elongation at break of about 2% to about 7% and a synthetic polymeric sheath covering the reinforcing material.

2. The composite hose of claim 1 wherein the core tube and adjacent fibrous layer are adhesively bonded together.

3. The composite hose of claim 1 wherein the core tube is nylon.

4. The composite hose of claim 1 wherein a plurality of an aromatic polyamide fibrous reinforcing material are disposed between the core tube and sheath.

5. The composite hose of claim 1 wherein the layer of reinforcing material adjacent to the core tube is braided aromatic polyamide filaments having a tenacity of 25 grams and another braided layer has filaments of poly(ethylene terrephthalate) ester or nylon.

6. The composite hose of claim 4 wherein at least one of the layers of fibrous reinforcing material comprises helically wound filaments.

7. The composite hose of claim 1 having a core tube, a first layer of the said fibrous material adjacent to the core tube, a braided layer of poly(ethylene terrephthalate) ester covering the said first layer and a polyurethane sheath.

8. The hose of claim 1 wherein one or more layers of the said fibrous material are disposed about the core tube and a reinforcing layer comprising poly(alkylene terephthalate) ester is disposed between the said fibrous material and the sheath.

9. The composite hose of claim 1 wherein the core tube is polyurethane.

10. The composite hose of claim 1 wherein a plurality of layers of reinforcing fibers are disposed about the core tube and at least one of the layers is formed of composite fibers having a tenacity of from about 7 to 11 grams per denier and another layer consists of fibers having a tenacity of from 12 to 25 grams per denier and an elongation at break of about 2% to about 7%.

11. A high burst strength flexible composite reinforced hose for conveying fluids under pressure comprising a synthetic polymeric core tube and a fibrous reinforcing material about the core tube having synthetic filaments having a tenacity of from 12 to 25 grams per denier with an elongation at break of about 2% to about 7%.

12. The hose of claim 11 wherein the reinforcing material is braided aromatic polyamide filaments.

13. A flexible composite reinforced hose for conveying fluids under pressure having a burst strength of greater than 10,000 pounds per square inch comprising a synthetic polymeric core tube, at least one layer of fibrous reinforcing material about the core tube and reinforcing it against bursting while conveying a fluid under pressure, said fibrous reinforcing material comprising strands of filaments having a tenacity of from 12 to 25 grams per denier and an elongation at break of from about 2% to about 7%, said strands being applied about the core tube at a lay of from about 40° to about 60° with the axis of the core tube.

14. The hose of claim 13 wherein the reinforcing material is braided aromatic polyamide filaments having a tenacity of about 20 grams per denier and an elongation of not more than 5%.

15. The hose of claim 11 wherein the core tube is nylon, the reinforcing material comprises a braided layer of aromatic polyamide fibers, and a braided layer of poly(ethylene terephthalate) ester or nylon.

16. The hose of claim 11 wherein the reinforcing material comprises a layer of braided aromatic polyamide fibers next to the core tube, a pair of oppositely helically wound layers of aromatic polyamide fibers next to the said braided layer, and a layer of braided poly(ethylene terephthalate) ester fibers around the helically wound layers.

* * * * *

UNITED STATES PATENT AND TRADEMARK OFFICE
CERTIFICATE OF CORRECTION

PATENT NO. : 3,905,398
DATED : September 16, 1975
INVENTOR(S) : Hans A. Johansen et al It is certified that error appears in the above—identified patent and that said Letters Patent are hereby corrected as shown below:

Claim 5, line 4, after "of", insert ---12 to---.

Signed and Sealed this twenty-seventh Day of January 1976

[SEAL]

Attest:

RUTH C. MASON
Attesting Officer

C. MARSHALL DANN
Commissioner of Patents and Trademarks